(12) United States Patent
Oeda et al.

(10) Patent No.: US 7,890,461 B2
(45) Date of Patent: Feb. 15, 2011

(54) SYSTEM EXECUTING LOG DATA TRANSFER SYNCHRONOUSLY AND DATABASE DATA TRANSFER ASYNCHRONOUSLY

(75) Inventors: Takashi Oeda, Sagamihara (JP); Nobuo Kawamura, Atsugi (JP); Kota Yamaguchi, Yamato (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 10/819,191

(22) Filed: Apr. 7, 2004

(65) Prior Publication Data
US 2005/0210073 A1    Sep. 22, 2005

(30) Foreign Application Priority Data
Mar. 19, 2004    (JP) .............................. 2004-079448

(51) Int. Cl.
G06F 7/00      (2006.01)
G06F 17/00     (2006.01)

(52) U.S. Cl. ........................ 707/614; 707/612; 707/649; 711/162

(58) Field of Classification Search .................. 707/10, 707/200, 201, 202, 612, 614, 649; 714/7, 714/16; 711/162
See application file for complete search history.

(56) References Cited

U.S. PATENT DOCUMENTS

| 4,751,702 A | 6/1988 | Beier et al. |
| 4,821,172 A | 4/1989 | Kaneko et al. |
| 5,170,480 A | 12/1992 | Mohan ........................ 707/201 |
| 5,280,611 A | 1/1994 | Mohan et al. |
| 5,530,855 A | 6/1996 | Satoh et al. |
| 5,594,900 A | 1/1997 | Cohn et al. |
| 5,640,561 A | 6/1997 | Satoh et al. |
| 5,745,674 A | 4/1998 | Lupton et al. |
| 5,758,355 A | 5/1998 | Buchanan |
| 5,781,912 A | 7/1998 | Demers et al. |
| 6,065,018 A | 5/2000 | Beier et al. |
| 6,163,856 A | 12/2000 | Dion et al. |

(Continued)

FOREIGN PATENT DOCUMENTS

JP    A-11-085408    3/1999

(Continued)

OTHER PUBLICATIONS

Veritas: "Veritas Volume Replication and Oracle Databases" Online! May 29, 2000, pp. 14-16, 20 and 23.

(Continued)

Primary Examiner—Apu M Mofiz
Assistant Examiner—Chelcie Daye
(74) Attorney, Agent, or Firm—Brundidge & Stanger, P.C.

(57) ABSTRACT

A disaster recovery system and a method therefor, having: a function for receiving write requests from a host computer to write log information indicating the contents of a database process executed for a database buffer on a main site, database data updated on the database buffer and status information indicating the position of log information used for disaster recovery; a function for transferring the received write request for log information to a recovery site by a synchronous remote copy process; and a function for transferring the received write request for database data to the recovery site by an asynchronous remote copy process. While remote copy can be executed at a long distance without data loss, the deterioration of the performance of a database process on a main site can be suppressed.

11 Claims, 8 Drawing Sheets

U.S. PATENT DOCUMENTS

| | | |
|---|---|---|
| 6,173,292 B1 | 1/2001 | Barber et al. |
| 6,173,377 B1 | 1/2001 | Yanai |
| 6,178,427 B1 | 1/2001 | Parker |
| 6,226,651 B1 | 5/2001 | Masuda et al. |
| 6,289,357 B1 | 9/2001 | Parker |
| 6,408,370 B2 | 6/2002 | Yamamoto |
| 6,446,176 B1 | 9/2002 | West et al. |
| 6,466,951 B1 | 10/2002 | Birkler et al. |
| 6,467,034 B1 | 10/2002 | Yanaka |
| 6,502,205 B1 | 12/2002 | Yanai et al. |
| 6,567,928 B1 | 5/2003 | Lyle et al. |
| 6,604,118 B2 | 8/2003 | Kleiman et al. |
| 6,606,694 B2 | 8/2003 | Carteau |
| 6,615,223 B1* | 9/2003 | Shih et al. ............. 707/625 |
| 6,643,795 B1 | 11/2003 | Sicola et al. |
| 6,658,590 B1 | 12/2003 | Sicola et al. |
| 6,671,705 B1 | 12/2003 | Duprey et al. |
| 6,723,123 B1 | 4/2004 | Kazatchkov et al. |
| 6,732,124 B1* | 5/2004 | Koseki et al. ......... 707/999.202 |
| 6,748,502 B2 | 6/2004 | Watanabe et al. |
| 6,779,058 B2* | 8/2004 | Kishi et al. ............. 710/60 |
| 6,850,958 B2 | 2/2005 | Wakabayashi |
| 6,889,231 B1 | 5/2005 | Souder |
| 6,983,362 B1 | 1/2006 | Kidder et al. ............. 713/1 |
| 7,003,694 B1* | 2/2006 | Anderson et al. ............. 714/16 |
| 7,032,131 B2* | 4/2006 | Lubbers et al. ............. 714/16 |
| 7,089,383 B2* | 8/2006 | Ji et al. ............. 711/162 |
| 2002/0007468 A1 | 1/2002 | Kampe et al. ............. 714/4 |
| 2002/0049925 A1 | 4/2002 | Galipeau et al. |
| 2002/0095547 A1 | 7/2002 | Watanabe et al. |
| 2002/0103815 A1 | 8/2002 | Duvillier et al. |
| 2002/0107878 A1 | 8/2002 | Tsuchida et al. |
| 2002/0133507 A1 | 9/2002 | Holenstein et al. |
| 2002/0188711 A1 | 12/2002 | Meyer et al. ............. 709/223 |
| 2003/0005355 A1 | 1/2003 | Yanai et al. |
| 2003/0074600 A1 | 4/2003 | Tamatsu |
| 2003/0126133 A1* | 7/2003 | Dattatri et al. ............. 707/10 |
| 2003/0126163 A1 | 7/2003 | Kim et al. |
| 2004/0034670 A1 | 2/2004 | Bhuyan |
| 2004/0044865 A1 | 3/2004 | Sicola et al. |
| 2004/0064639 A1 | 4/2004 | Sicola et al. |
| 2004/0073831 A1* | 4/2004 | Yanai et al. ............. 714/7 |
| 2004/0098371 A1 | 5/2004 | Bayliss et al. |
| 2004/0098425 A1 | 5/2004 | Wiss et al. |
| 2004/0107381 A1 | 6/2004 | Bomfim et al. |
| 2004/0133591 A1 | 7/2004 | Holenstein et al. |
| 2004/0139124 A1 | 7/2004 | Kawamura et al. |
| 2004/0158588 A1 | 8/2004 | Pruet, III |
| 2004/0193625 A1 | 9/2004 | Sutoh |
| 2004/0193658 A1 | 9/2004 | Kawamura et al. |
| 2004/0205312 A1* | 10/2004 | Zlotnick et al. ............. 711/162 |
| 2005/0229021 A1 | 10/2005 | Lubbers et al. ............. 714/2 |
| 2005/0262298 A1 | 11/2005 | Lubbers et al. ............. 711/112 |
| 2005/0262312 A1 | 11/2005 | Morishita |
| 2006/0010180 A1 | 1/2006 | Kawamura et al. |

OTHER PUBLICATIONS

C. Mohan et al "Algorithms for the Management of Remote Backup Databases for Disaster Recovery", Proceedings of the International Conference on Data Engineering, Apr. 1993, vol. CONF. pp. 511-518.

Burkes, et al "Design Approaches for Real-Time Transaction Processing Remote", Computer Society International Conference, Feb.-Mar. 2, 1990, vol. Conf. 35, pp. 568-572.

Jim Gray and Andreas Reuter, Transaction Processing, Concepts and Techniquies, Morgan Kaufmann Publishers, 1993, pp. 556-557, 604-609.

Rahm, Performance Evaluation of Extended Storage Architectures for Transaction Processing, University of Kaiserslautern, Germany.

Niklander, Tiina et al, "Using Logs to Increase Availabiliity in Real-Time Databases", Workshop on Parallel and Distributed Real-Time Systems, 2002, 7 pages.

Matthews et al, "Improving the Performance of Log-Structred File Systems with Adaptive Methods", Proceedings of the 16th ACM Symposium on Operating Systems Principles, 1997, pp. 238-251.

Azagury et al, "Advanced Functions for Storage Subsystems: Supporting Continous Availabiliity", IBM Systems Journal, vol. 42, No. 2, 2003, pp. 268-279.

"No Data Loss Standby Database: Benefits of Combining EMC Symmetrix Remote Data Facility (SRDF) with Oracle Standby Database", EMC Corporation, 1998, 18 pages.

Stacey, D., "Replication: DB2, Oracle, or Sybase?", SIGMOD Record, vol. 21, No. 4, Dec. 1995, pp. 95-101.

W. Haifeng, et al "The Database Recovery Rategy in Oracle", Journal of Inner Mongolia Polytechnic University, Aug. 26, 2003, pp. 1-9.

Veritas Volume Replicator, Enterprise-Class Disaster Recovery for Mission-Critical Environments, 1992.

* cited by examiner

MAIN WRITE DATA MANAGEMENT INFORMATION

SUB WRITE DATA MANAGEMENT INFORMATION

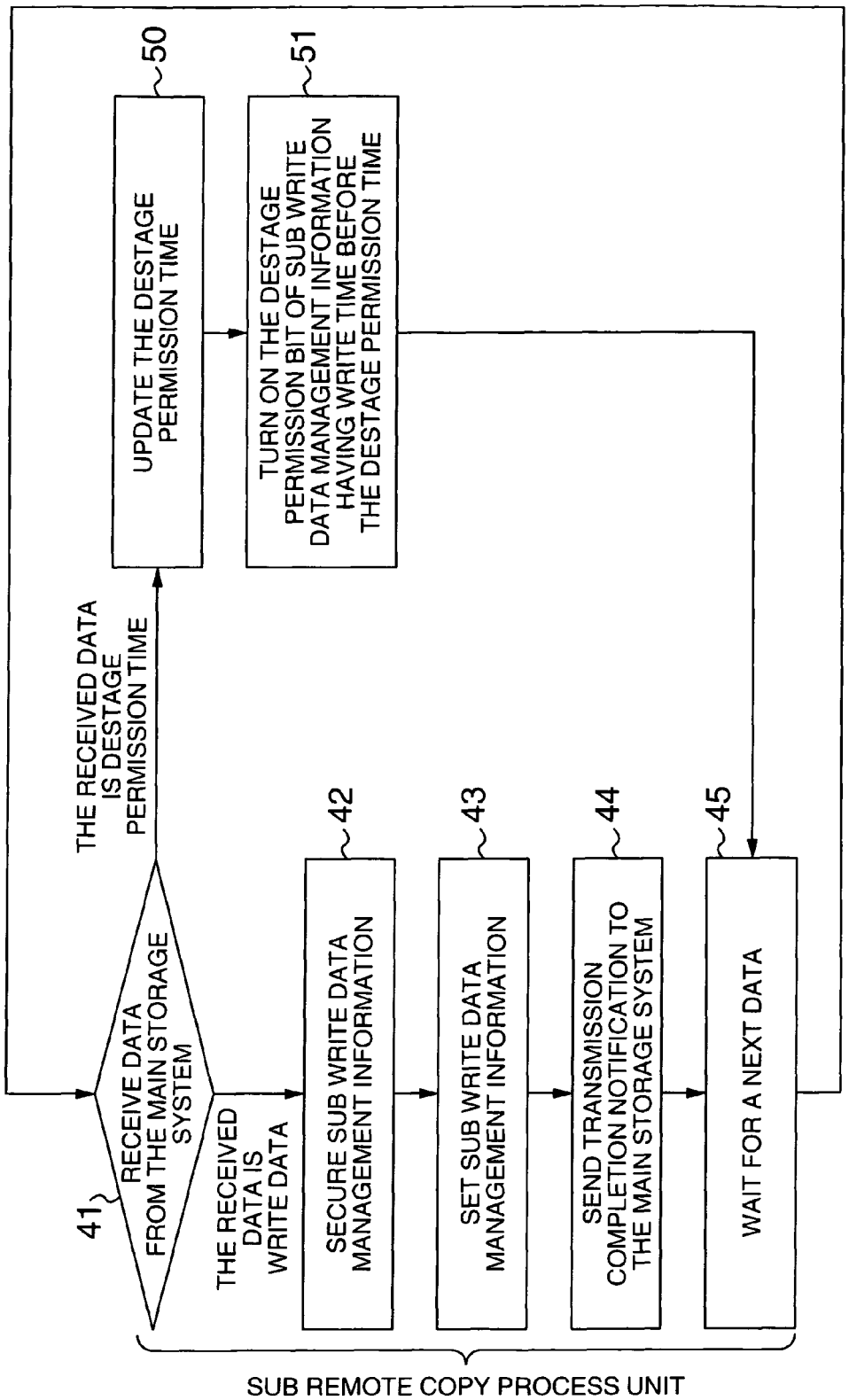

FIG. 7
DB-DISK MAPPING TABLE

| DATABASE REGION ID | FILE ID | KIND | MAIN STORAGE SYSTEM ID | MAIN LOGICAL DISK ID (LUN) | SUB STORAGE SYSTEM ID | SUB LOGICAL DISK ID (LUN) |
|---|---|---|---|---|---|---|
| DBAREA1 | FILE11 | DB | CTL#A1 | VOL11-A | CTL#B1 | VOL11-B |
| DBAREA2 | FILE21 | DB | CTL#A1 | VOL11-A | CTL#B1 | VOL11-B |
| LOG1 | FILE31 | LOG | CTL#A1 | VOL12-A | CTL#B1 | VOL12-B |
| LOG2 | FILE32 | LOG | CTL#A2 | VOL22-A | CTL#B1 | VOL22-B |
| STATUS1 | FILE41 | STATUS | CTL#A2 | VOL21-A | CTL#B2 | VOL21-B |

FIG. 8
MAIN/SUB REMOTE COPY MANAGEMENT TABLE

| COPY MODE | MAIN STORAGE SYSTEM ID | MAIN LOGICAL DISK ID (LUN) | SUB STORAGE SYSTEM ID | SUB LOGICAL DISK ID (LUN) | CONSISTENCY GROUP ID |
|---|---|---|---|---|---|
| ASYNCHRONOUS | CTL#A1 | VOL11-A | CTL#B1 | VOL11-B | CTG-01 |
| SYNCHRONOUS | CTL#A1 | VOL12-A | CTL#B1 | VOL12-B | NULL |
| ASYNCHRONOUS | CTL#A1 | VOL22-A | CTL#B1 | VOL22-B | CTG-01 |
| SYNCHRONOUS | CTL#A1 | VOL21-A | CTL#B1 | VOL21-B | NULL |

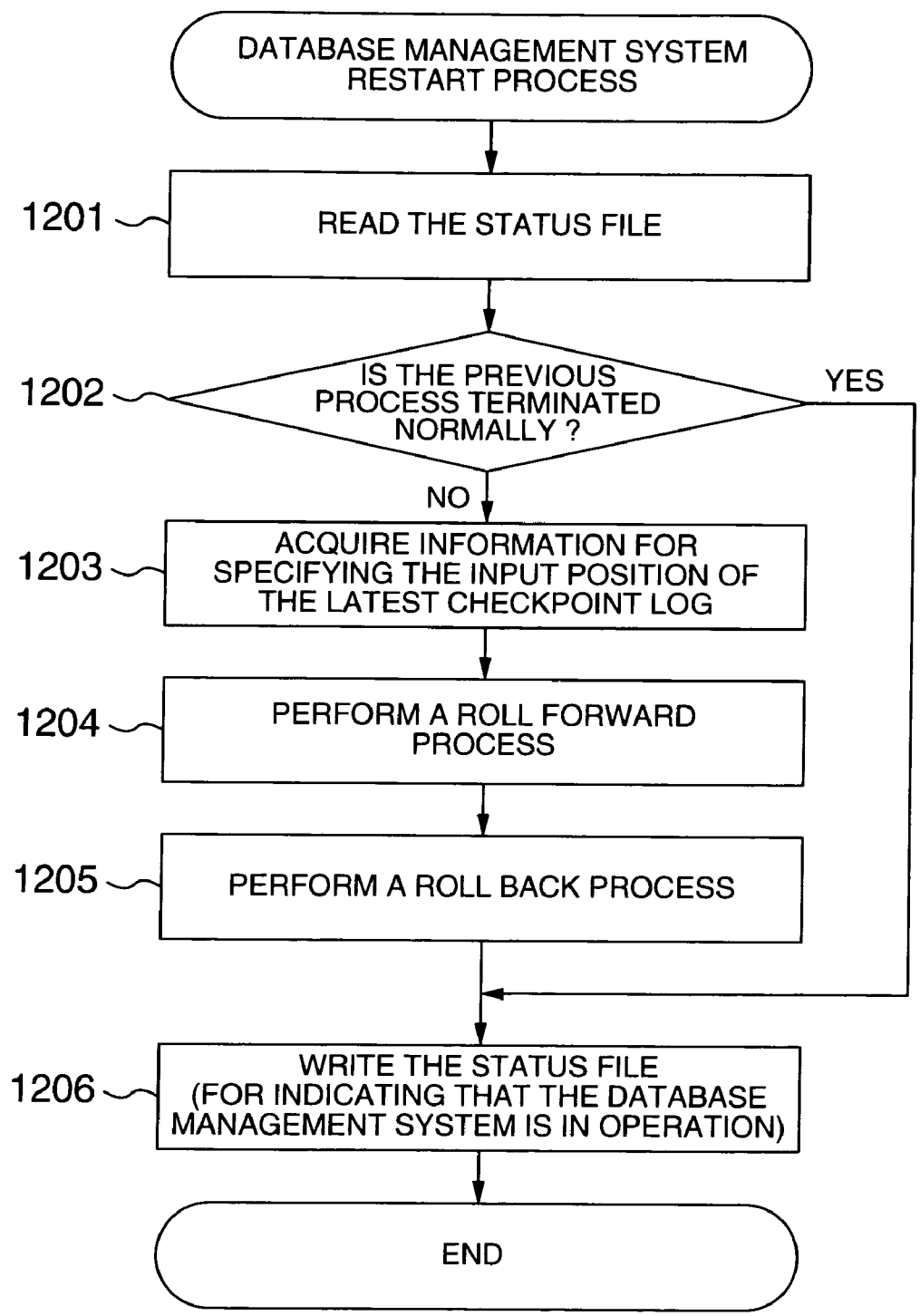

SYSTEM EXECUTING LOG DATA TRANSFER SYNCHRONOUSLY AND DATABASE DATA TRANSFER ASYNCHRONOUSLY

BACKGROUND OF THE INVENTION

The present invention relates to a technique for committing processing executed by a certain information processing system to another information processing system or a program or object for executing the processing at the time of occurrence of a disaster or predetermined condition in the certain information processing system or in accordance with a request. Particularly it relates to a database management system.

In a conventional database management system, a storage region (hereinafter referred to as "DB buffer") is reserved on a memory of a computer (hereinafter referred to as "database server" or "DB server") executing a database management program so that update data (hereinafter referred to as "DB data") are temporarily stored in the DB buffer to increase the speed of rewriting of the DB data (table space) into a database by a transaction. The data written on the DB buffer are finally written in a storage system having a nonvolatile storage medium (hereinafter referred to as "storage system"). Generally, in the database server, the DB buffer is used as a temporary storage means because access time to the storage system is larger than access time to the memory.

The speed of data write/read (hereinafter generically referred to "I/O") in the DB buffer is higher than the speed of I/O in the storage system. The memory of the database server is however generally volatile. Data stored in the memory vanish at the time of power failure or server restart. In addition, data may vanish at the time of hardware failure in the database server. The database management system generates and manages a log (journal) to prevent the contents of the transaction to be committed from vanishing in such a case.

Specifically, the database management system is sure to write the update contents of the DB data concerning a certain transaction as a log having a log sequence number (LSN) in a log storage region (hereinafter referred to as "logical disk") of the storage system before the transaction is committed.

When DB data on the DB buffer are written in a DB data logical disk of the storage system by a checkpoint process, the database management system records information of the checkpoint process corresponding to the log sequence number as status information of the log.

In a process of restarting the database management system after occurrence of disaster in the database management system, the database management system writes update data of the transaction committed at the time of occurrence of the disaster in the DB data logical disk by using the log and cancels data update concerning a non-committed transaction. Because data update on the DB buffer is reflected on the DB data volume by the checkpoint process, the log used in this case is a portion recorded after the latest checkpoint. The log sequence number corresponding to the latest checkpoint is judged by referring to the status information.

The data recovery process based on the log has been described in detail in Jim Gray et al., "TRANSACTION PROCESSING; Concepts and Techniques", pp. 556-557, 604-609.

Because the recovery process is carried out on the assumption that DB data volume and log data volume can be used at the time of restart of the data management system, it is impossible to use the recovery process when the storage system suffers from a disaster such as an earthquake, a fire or a terrorist act. As a technique provided for such a case, there is known a method in which log and DB data necessary for restarting the database management system are sent to a remote computer system not suffering from the disaster (hereinafter referred to as "recovery site") in advance. Specifically, a remote copy technique is known.

Remote copy is a technique in which a computer system in operation of a database management system or the like (hereinafter referred to as "main site") and a storage system on the recovery site are connected to each other by a communication line (hereinafter referred to as "link") and in which a storage system on the main site (hereinafter referred to as "main storage system") sends data to be written in the main storage system (hereinafter referred to as "write data") to the remote site. Incidentally, as a modified example, there is also a technique in which a computer or switch connected to the main storage system sends write data to the recovery site.

Remote copy is classified into synchronous remote copy and asynchronous remote copy. In the synchronous remote copy, a process of sending data to the recovery site is synchronized with a write request process from a computer on the main site (hereinafter referred to as "host"), that is, write data are transferred to the recovery site before completion of a write request process and then a notice of completion of the write request process is sent to the recovery site. In the asynchronous remote copy, the two processes are carried out asynchronously, that is, data are transferred to the recovery site after a notice of completion of data write is sent to the recovery site when data write based on the write request process is completed. The remote copy technique has been disclosed in U.S. Pat. No. 5,640,561 and JP-A-11-85408. Particularly U.S. Pat. No. 5,640,561 has disclosed a technique of asynchronous remote copy for guaranteeing that a data update sequence in a storage system on the recovery site (hereinafter referred to as "sub storage system") is made equal to a data update sequence from the host to the main storage system.

When the aforementioned synchronous remote copy technique is used, the process of restarting the database management system can be directly applied to the case where recovery from a disaster is carried out on the recovery site because the main site is disabled from continuing its transaction due to the disaster. That is, logical disks in which log and DB data and status information necessary for the restart process are stored respectively are transferred to the recovery site by synchronous remote copy. In the case of synchronous remote copy, the contents of data in the logical disks on the recovery site are the same as those on the main site. When an ordinary restart process is carried out by a database management system on the recovery site (hereinafter referred to as "standby database management system"), data can be recovered on the main site without missing of any committed transaction and without remaining of any updated non-committed transaction.

As described above, when synchronous remote copy is used, recovery from disaster can be made while the contents of the transaction are guaranteed. In the synchronous remote copy, performance of a database management system on the main site (hereinafter referred to as "active database management system") however deteriorates because a write command response time of the host on the main site increases as the time required for back-and-forth motion of packets on the link increases in accordance with increase in distance between the main site and the recovery site and increase in delay of devices constituting the link between storage systems.

Asynchronous remote copy is a remote copy technique for suppressing the increase of the command response time. As described above, in the asynchronous remote copy, the main storage system sends a notice of completion of the write command to the host on the main site without waiting for the completion of sending write data to the sub storage system. As a result, increase in the write command response time on the main site can be suppressed.

The following two kinds of methods have been conventionally used for applying the synchronous/asynchronous remote copy to the process of restarting the standby database management system.

(1) Synchronous Log Data Transfer and Synchronous DB Data Transfer

This is a method in which both write data to be written in the log logical disk and write data to be written in the DB data logical disk are sent to the sub storage system by synchronous remote copy. Because synchronous remote copy is used, there is a guarantee that all write processes issued from the DB server to the main storage system and completed are reflected on the sub storage system. For this reason, the process of restarting the standby database management system can be made in the same procedure as used for the process of restarting the active database management system. Accordingly, there is no missing of the committed transaction on the main site. Performance of the active database management system however deteriorates when the distance between the main site and the recovery site increases or when the quantity of delay on the link increases. In this method, when the logical disk in which status information indicating the status of the log data is stored is different from the logical disk in which log or DB data are stored, write data for the status information logical disk are also sent to the sub storage system by synchronous remote copy.

(2) Asynchronous Log Data Transfer and Asynchronous DB Data Transfer

This is a method in which both write data for the log logical disk and write data for the DB data logical disk are sent to the sub storage system by asynchronous remote copy. Because asynchronous remote copy is used, the influence on the performance of the main site database management system due to increase in the quantity of delay on the link can be concealed easily. There is however a possibility that the latest transaction may vanish at the time of restart on the recovery site because there is no guarantee that all log data of the committed transaction on the main site will be reflected on the sub storage system.

SUMMARY OF THE INVENTION

In the conventional method for executing log data transfer synchronously and DB data transfer synchronously, the performance of the active database management system is apt to deteriorate because increase in distance between the main site and the recovery site or increase in delay on the link has a direct bearing on increase in response time of the write processes issued from the active database management system to both the log logical disk and the DB data logical disk of the main storage system.

On the other hand, in the conventional method for executing log data transfer asynchronously and DB data transfer asynchronously, there is a possibility that some of the latest transactions committed on the main site may vanish at the time of restart of the standby database management system because there is a possibility that information of all transactions committed by the active database management system may not be reflected on the sub storage system.

An object of the present invention is to provide a system in which missing of transactions is avoided while deterioration in performance of an active database management system is prevented.

An aspect of the invention is as follows.

A main storage system transfers write data for a log logical disk to a sub storage system on a recovery site by using synchronous remote copy. The main storage system transfers write data for a DB data logical disk to the sub storage system on the recovery site by using asynchronous remote copy guaranteeing a write sequence of write data for the DB data logical disk.

In the aspect of the invention, a time difference is generated between the state of log data and the state of DB data on the sub storage system. This is because updating of DB data is delayed while updating of log data is executed in real time. This delay must be considered when the restart process is to be executed on the standby database management system. Although roll forward generally starts at the latest checkpoint of the log, there is a possibility that the state of DB data may be older than that at the latest checkpoint. In this case, roll forward needs to start at a checkpoint older than the latest checkpoint.

The following configuration is conceived as another aspect of the invention. That is, while the aforementioned delay is considered, a file for storing log status information such as checkpoint positions on the log is arranged on a logical disk different from logical disks for storing log and DB data. Configuration is set so that asynchronous remote copy is executed on the assumption that the logical disk for storing the log status information and the DB data logical disk form one consistency group. When the restart process is to be executed oh the standby database management system, the position of the log at which roll forward will start is decided by referring to the status information.

The following configuration is conceived as a further aspect of the invention. That is, a plurality of log files are set on the log logical disk so that unnecessary one of the log files is re-used for the restart process. In this case, before the log file to be re-used (hereinafter referred to as "online archive") is re-used for recording new log data, the contents of the log file may be saved into a removable medium such as a magnetic tape device.

As a further aspect of the invention, a log file having been already stored in a magnetic tape device or the like may be used for reconstructing DB data.

BRIEF DESCRIPTION OF THE DRAWINGS

FIG. 5 is a view showing the outline of an asynchronous remote copy process on a sub storage system side in the embodiment;

FIG. 7 is a flow chart showing the procedure of a data receiving process of the sub storage system in the embodiment;

FIG. 8 is a flow chart showing the procedure of a database management system start process in the embodiment;

FIG. 10 is a flow chart showing the procedure of a restart process in the embodiment.

DESCRIPTION OF THE EMBODIMENTS

A system according to an embodiment of the invention will be described below. Incidentally, it is a matter of course that the invention is not limited to the following embodiment.

Figure 1:
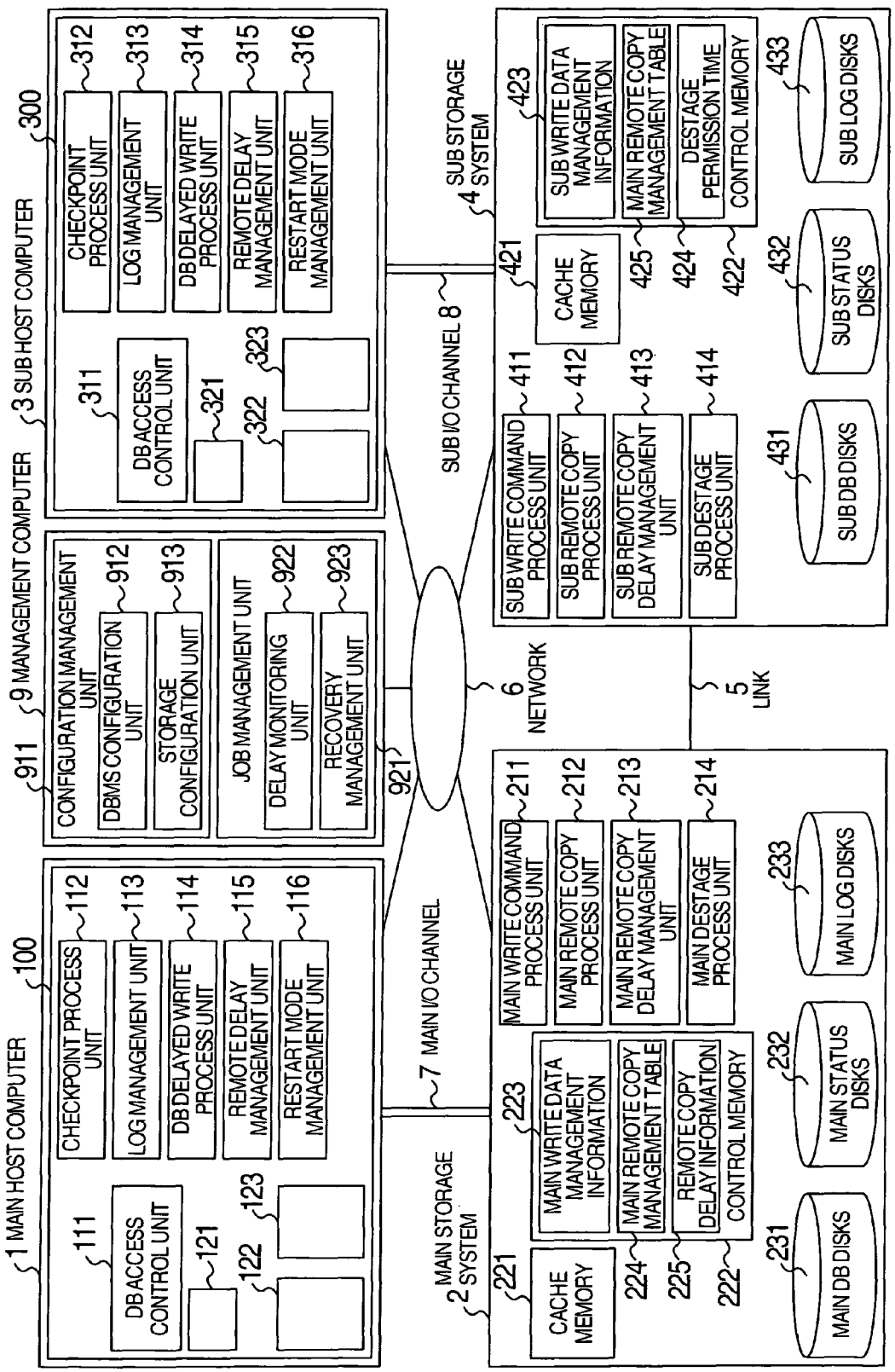
FIG. 1 is a diagram showing the system configuration of a disaster recovery system according to an embodiment of the invention.

FIG. 1 is a diagram showing the configuration of the system according to this embodiment. The system according to this embodiment has a main host computer 1, a main storage system 2, a sub host computer 3, a sub storage system 4, and a management computer 9. The constituent members of the system are connected to one another through a network 6. The main storage system 2 and the sub storage system 4 are connected to each other through a link 5.

An active database management system 100 of the main host computer 1 (which may be achieved by a computer or information processor or may be achieved by a program or object that can execute the processing) includes a DB access control unit 111, a checkpoint process unit 112, a log management unit 113, a DB delayed write process unit 114, and a remote delay management unit 115. Incidentally, a device expressed as "unit" may be achieved by a hardware exclusively used for executing a corresponding process or by a combination of a general-purpose processor and a program. Accordingly, the main host computer 1 may be formed to include programs corresponding to the aforementioned units, and a general-purpose processor. The main host computer 1 further includes a storage unit. The storage unit has a DB buffer 122, and a log buffer 123.

The DB access control unit 111 is a processing unit for controlling access to a main DB disk 231 and a main log disk 233 through the DB buffer 122 and the log buffer 123.

The checkpoint process unit 112 is a processing unit for sending a write request from the main host computer 1 to the main storage system 2 to write all data blocks of DB data (hereinafter referred to as "DB blocks") updated on the DB buffer 122 and status information indicating a log disk of the newest log record at that point of time and the storage position of the newest log record on the log disk when the contents of the DB buffer 122 of the main host computer 1 need to be reflected on the storage unit in the main storage system 2.

Incidentally, because a certain transaction may be uncompleted yet when the checkpoint process is executed, the status information may indicate the position of the oldest log record concerning the uncompleted transaction instead of the position of the newest log record. Updating of the status information may be delayed on the storage system. In any case, the status information can be used as information indicating the position of the log at which reference to the log will start when the database management system restarts.

The log management unit 113 is a processing unit for sending a write request from the main host computer 1 to the main storage system 2 to write a log block as log information indicating the contents of a database process executed on the DB buffer 122.

The DB delayed write process unit 114 is a processing unit for sending a write request from the main host computer 1 to the main storage system 2 to write database data on the DB buffer 122.

The remote delay management unit 115 acquires the quantity of data update delay generated on the sub storage system 4 side by asynchronous remote copy between the main storage system 2 and the sub storage system 4 and supplies information concerning the acquired quantity of delay to the log management unit 113. The remote delay management unit 115 compares the acquired quantity of delay with a threshold value of delay set in advance and performs a process such as a process of giving a warning to a system administrator or the like when the acquired quantity of delay is larger than the threshold value of delay.

After programs for making the main host computer 1 function as the DB access control unit 111, the checkpoint process unit 112, the log management unit 113 and the DB delayed write process unit 114 respectively are recorded in a recording medium such as CD-ROM and stored in a magnetic disk or the like, the programs are loaded into the memory and executed. Incidentally, the recording medium for recording the programs may be another recording medium than CD-ROM. The programs may be used after installed in an information processor from the recording medium or may be used after access to the recording medium through a network. Incidentally, programs for other devices can be set up in the same manner as described above.

The main storage system 2 is a device for storing data of the main host computer 1 in a disk device or a cache memory and performing reading, writing, updating, etc. of data in response to a read or write command. The main storage system 2 sends data written in the main host computer 1 to the sub storage system 4 through the link 5. The main storage system 2 includes recording media such as a disk device, and a control unit for controlling these recording media.

The control unit has a main write command process unit 211, a main remote copy process unit 212, a main remote copy delay management unit 213, and a main destage process unit 214. The control unit further has a cache memory 221, and a control memory 222. Logical storage regions ("logical disks") are constituted by physical storage regions of recording media such as a disk device. Specifically, the recording media such as a disk device have a main DB disk 213, a main status disk 232, and a main log disk 233 as logical disks.

The main write command process unit 211 receives a write command issued from the main host computer 1 and stores write data in the cache memory 221. On this occasion, the main write command process unit 211 sets main write data management information 223 on the control memory 222.

The main remote copy process unit 212 sends write data for the logical disk set as a subject of remote copy to the sub storage system 4 through the link 5. Information concerning the local disk as a subject of remote copy and the storage system as a destination of transmission is stored on the main remote copy management table 224 on the control memory 222. Information concerning write data to be transferred is stored in the main write data management information 223.

The main destage process unit 214 performs a process of writing data updated on the cache memory 221 into a logical disk of the main storage system 2. Information of data to be written is acquired from the main write data management information 223.

The main host computer 1 exchanges read/write commands and data with the main storage system 2 through a main I/O channel 7. A disk image provided from the main storage system 2 to the main host computer 1 is identified by LUN (Logical Unit Number). Because the disk image is mapped on a storage region on at least one disk device included in the main storage system 2, the disk image identified by the LUN corresponds to a logical disk if the main storage system 2 is regarded as a subject of discussion. (Because the host computer or the database management system performs higher-rank mapping, the disk image may be called "physical disk" if the host computer or the database management system is regarded as a subject of discussion.)

A standby database management system 300 of the sub host computer 3 (which may be of the same kind as that of the main host computer 1) includes a DB access control unit 311, a checkpoint process unit 312, a log management unit 313, a DB delayed write process unit 314, a remote delay management unit 315, and a restart mode management unit 316. The sub host computer 3 also includes a DB buffer 322, and a log buffer 323.

The DB access control unit 311, the checkpoint process unit 312, the log management unit 313 and the DB delayed write process unit 314 are processing units for executing the same processes as executed by the respective processing units of the active database management system when the standby database management system is in operation.

The restart mode management unit 316 sets a restart mode in the standby database management system 300 on the assumption that a time difference is generated between a sub log disk 431 onto which write data are transferred by synchronous remote copy and a sub DB disk 433 onto which write data are transferred by asynchronous remote copy.

The sub storage system 4 is the same storage device as the main storage system 2. The sub storage system 4 stores data for the sub host computer 3 in a disk device or cache and performs reading, updating, etc. of data in response to a read/write command. The sub storage system 4 receives data written by the main host computer 1 from the main storage system 2 through the link 5 and writes the data in the logical disk (practically, the disk device constituting the logical disk) included in the sub storage system 4. The sub storage system 4 has a control unit, and recording media such as a disk device.

The control unit has a sub write command process unit 411, a sub remote copy process unit 412, a sub remote copy delay management unit 413, and a sub destage process unit 414. The control unit further has a cache memory 421 and a control memory 422. The recording media such as a disk device have a sub log disk 431, a sub status disk 432, and a sub DB disk 433 as logical disks.

The sub write command process unit 411 executes the same process as executed by the main write command process unit 211 of the main storage system 2.

The sub remote copy process unit 412 receives write data for the logical disk set as a subject of remote copy from the main storage system 2 through the link 5. The sub remote copy process unit 412 acquires information of write data for guaranteeing an update sequence of write data from sub write data management information 423 and uses destage permission time 424 received from the main storage system 2 for judging whether the sequence of write data can be guaranteed or not.

The sub destage process unit 414 performs a process of writing remote copy data stored on the cache memory 421 into a logical disk of the sub storage system 4. Information of data to be written is acquired from the sub write data management information 423.

The management computer 9 is a computer which is used by an administrator or the like when configuration management or job management of the system as a whole is made. The management computer 9 includes a configuration management unit 911, and a job management unit 921.

The configuration management unit 911 has a DBMS (Data Base Management System) configuration unit 921 for managing the configuration of the database management system, and a storage configuration unit 913 for managing the configuration of the storage system. The job management unit 921 has a delay monitoring unit 922 for monitoring the quantity of delay from the main storage system in updating of write data on the logical disk (or cache memory 421) of the sub storage system by asynchronous remote copy, and a recovery management unit 923 for managing a job for continuing a transaction on the recovery site when the transaction is interrupted because of a disaster, etc. of the main site.

The main host computer 1 exchanges commands and data with the main storage system 2 through the I/O channel 7. The sub host computer 3 exchanges commands and data with the sub storage system 4 through the I/O channel 8. Fibre Channel can be used as each of the I/O channels 7 and 8 and the link 5. Another protocol or transfer medium may be used. Fibre Channel is standardized in ANSI (American National Standard Institution) so that a plurality of upper protocols can be selected. Generally, SCSI (Small Computer System Interface) is often used as an upper protocol.

Incidentally, iSCSI, which is a standard using SCSI as an upper protocol of TCP/IP, has been standardized in ANSII in 2003. It is conceived that the network 6 will contain a network used in LAN or the like, and a range of from a physical layer to a TCP/IP layer in the future. In this case, the network 6 and a range of from a physical layer to a transport layer in the I/O channel 7 will be contained. There is a possibility that the link 5 between the storage systems will change in the same manner as described above in the future.

The link 5 for connecting the main storage system 2 and the sub storage system 4 to each other may be Fibre Channel, Ethernet (trademark registered) or gigabit Ethernet or a network such as SONET. A virtual network or a data communication means such as wireless communication, broadcast communication or satellite communication may be also used as the link 5.

Generally, the network 6 is constructed by Ethernet and mainly used for exchanging management and configuration information. Specifically, though information such as alarm information is transmitted/received when an event set in the storage system etc. in advance occurs, the network 6 may be used for transferring DB data, etc.

The operations of the main host computer 1 and the main storage system 2 will be described below.

In the main host computer 1, the active DB access control unit 111 is operated so that the main host computer 1 temporarily stores the contents of the main DB disk 231 of the main storage system 2 in the DB buffer 122 and temporarily stores the contents of a process for updating the main log disk 233 in the log buffer 123. Generally, the DB buffer 122 and the log buffer 123 may be volatile memories in which data vanish at the time of power failure etc.

When a transaction requests the main host computer 1 to make access to a record on the main DB disk 231, the DB access control unit 111 of the main host computer 1 acquires a corresponding DB block from the main storage system 2 by a read command, stores the DB block in the DB buffer 122 and executes a database process for the DB block on the DB buffer 122. After the database process, the DB access control unit 111 stores log information indicating the contents of the database process in a log block of the log buffer 123.

When the contents of the DB buffer 122 of the main host computer 1 need to be reflected on the logical disk of the main storage system 2 because the number of log records indicating updating of records on the DB buffer 122 reaches a predetermined number, the checkpoint process unit 112 generates a write command for writing all updated DB blocks and status information as a request to write all DB blocks updated on the DB buffer 122 and status information indicating the newest log record at that point of time and sends the write command from the main host computer 1 to the main storage system 2. Incidentally, when the write command is sent, write data corresponding to the write command are sent following the write command.

When a predetermined condition in which a predetermined time has passed after the start of recording of log information or all regions of the log buffer 123 have become busy is reached at the time of committing of a transaction, the log management unit 113 generates a write command for writing the log block as a request to write the log block of the log buffer 123 in the main log disk 233 and sends the write command from the main host computer 1 to the main storage system 2.

When a predetermined condition in which a predetermined time has passed after the start of the database process (for generating a table, or the like) or all regions of the DB buffer 122 have become busy is reached, the DB delayed write process unit 114 generates a write command for writing the DB block as a request to write the DB block of the DB buffer 122 in the main DB disk 231 and sends the write command from the main host computer 1 to the main storage system 2. Incidentally, the operation of the DB delayed write process unit 114 is independent of the operation of the checkpoint process unit 112 so that the operation of the DB delayed write process unit 114 may be repeated during the operation of the checkpoint process unit 112.

Upon reception of the write command from the main host computer 1, the main write command process unit 211, the cache memory 221 and the main destage process unit 214 in the main storage system 2 operate to update data of the main DB disk 231 which is a logical disk mapped on the disk device. On this occasion, write data are temporarily stored in the cache memory 221. Generally, the cache memory 221 may be constituted by a nonvolatile memory in which data do not vanish even at the time of power failure etc. When a nonvolatile memory is used as the cache memory 221, saving of data can be guaranteed against power failure etc. at the point of time when the data are stored in the cache memory 221. In addition, data can be guaranteed against system down of the host computer at the point of time when a notice of completion of write is sent back to the host computer.

Upon reception of the write request sent from the main host computer 1 in the aforementioned manner, the main storage system 2 executes a synchronous remote copy process for the sub storage system 4 synchronously with the write process for the main storage system 2 when the write request is a request to write the log block, and executes an asynchronous remote copy process for the sub storage system 4 asynchronously with the write process for the main storage system 2 when the write request is a request to write the DB blocks and status information. Incidentally, the main storage system 2 executes the following synchronous or asynchronous remote copy process while making a judgment according to table information (which will be described later) as to whether the logical block designated by the received write command is a subject of synchronous remote copy or a subject of asynchronous remote copy.

Figure 2:
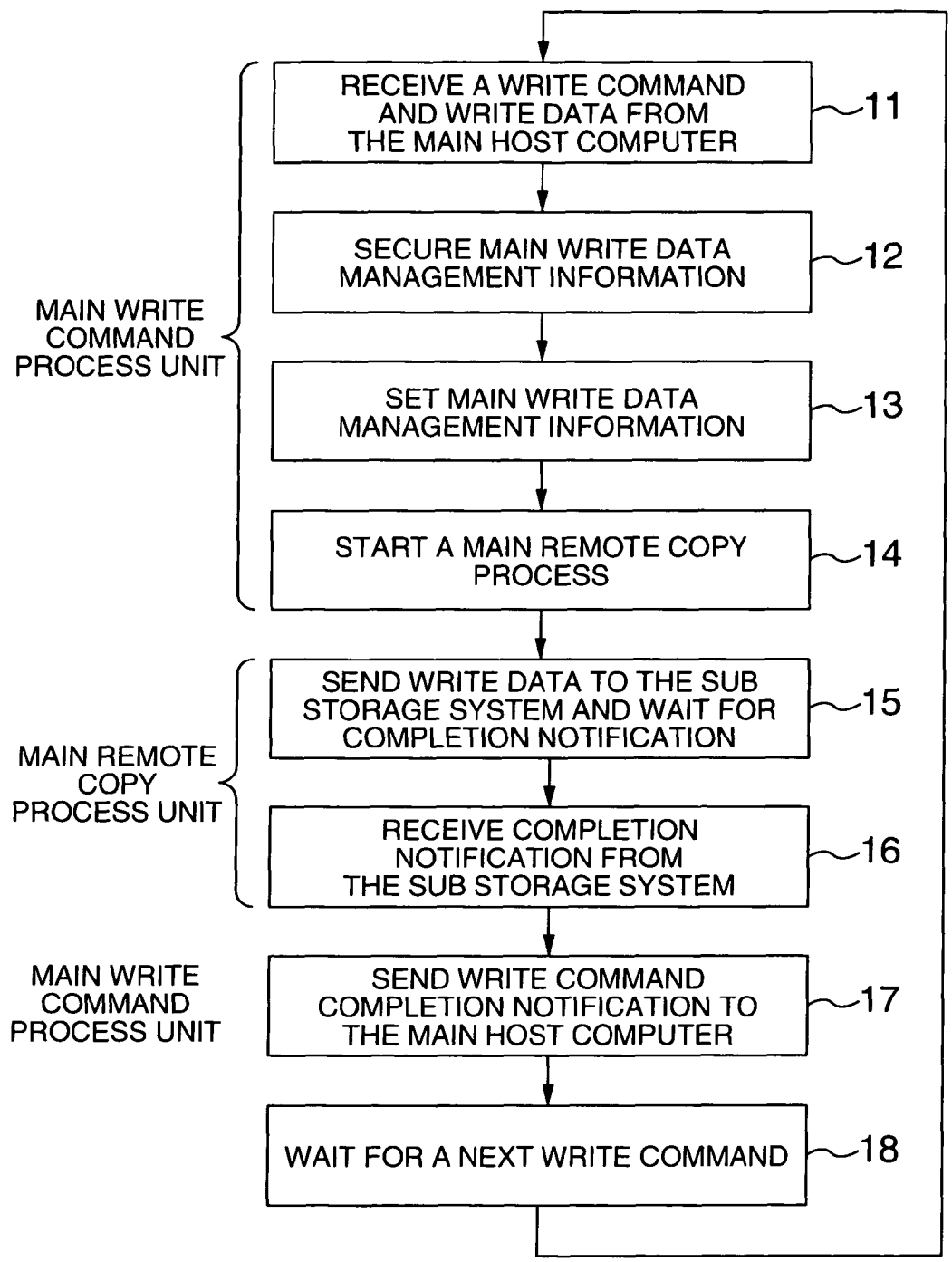
FIG. 2 is a view showing the outline of a synchronous remote copy process in the embodiment.

FIG. 2 is a view showing a processing flow of synchronous remote copy.

Figure 4:
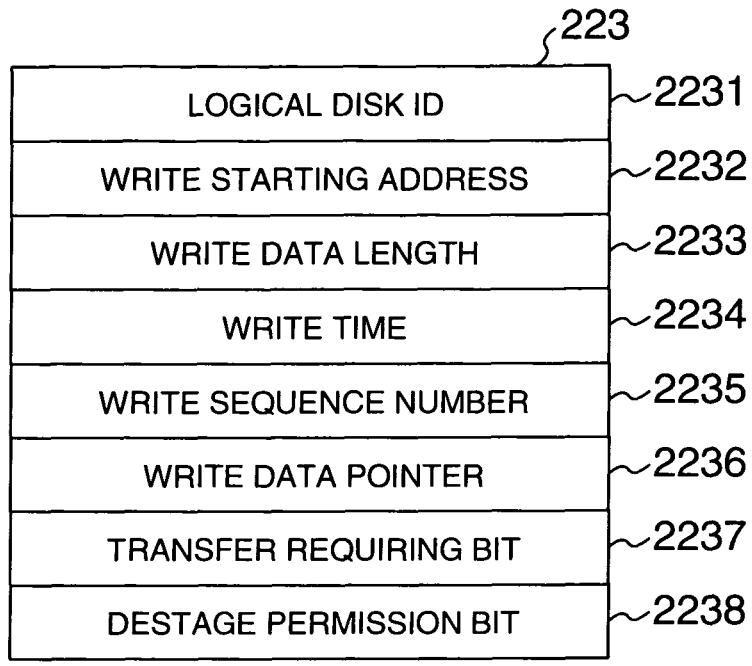
FIG. 4 is a view showing main write data management information in the embodiment.

Upon reception of a write command and write data from the main host computer 1 (step 11), the main write command process unit 211 of the main storage system 2 reserves a region in the control memory 222 for storing main write data management information 223 corresponding to the received write data. On this occasion, the received write data are stored in the cache memory 221 (step 12). Then, the main write command process unit 211 sets main write data management information. Of the main write data management information, write time 2234 shown in FIG. 4 is added to the write command by an operating system of the main host computer 1. If the main host computer 1 has no time management function, the main storage system 2 may use its own timer for setting the time of reception of the write command in the write time 2234.

Incidentally, the write time is not always necessary for synchronous remote copy but is used for guaranteeing the sequence of the write process in asynchronous remote copy (step 13) as will be described later.

FIG. 4 is a view showing an example of the contents of the main write data management information 223. Incidentally, the main write data management information 223 is generated whenever write data are received from the main host computer 1. The main write data management information 223 has a plurality of entries for storing respective pieces of information.

An ID is registered in the logical disk ID 2231 so that the main host computer can identify volume (logical disk) in the main storage system by the ID. This ID is often called "physical disk ID" viewed from the database management system or the operating system of the host computer.

Information for designating an address which is on the logical disk identified by the logical disk ID and which is used for storing the write data is stored in the entries of write starting address 2232 and write data length 2233.

The write data sent from the main host computer 1 are temporarily stored in the cache memory 221 of the main storage system. Information of a pointer indicating a position on the cache memory is stored in the entry of write data pointer 2236.

When data are to be written in the logical disk in which remote copy is set, the bit in the entry of transfer requiring bit 2237 is turned on at the stage of step 13. The transfer requiring bit is used for asynchronous remote copy which will be described later. This bit is not necessarily used in the synchronous remote copy operation.

The main storage system 2 turns on a destage permission bit 2238 at the point of time when the write data given from the main host computer 1 are stored in the cache memory 221. The main destage process unit 214 operates so that the write data in which the destage permission bit 2238 is turned on can be written in the disk device and erased from the cache memory 221 for the purpose of reversing a region of the cache memory 221. Generally, the destage sequence of write data is decided by LRU (Least Recently Use) algorithm.

Write sequence number is a numerical value for indicating a write sequence viewed from the main host computer. This numerical value is stored in the entry 2235. In this embodiment, the write sequence number 2235 is not referred to. A method of using the write sequence number 2235 in combination may be used.

Referring back to FIG. 2, the processing procedure will be described. After the completion of the step 13, the main write command process unit 211 starts a remote copy process (step 14). The main remote copy process unit 212 sends the write data to the sub storage system 4 (step 15) in response to the start of the remote copy process. After reception of a notice of completion from the sub storage system 4 (step 16), the main write command process unit 211 sends a notice of completion of the write command process to the main host computer 1 (step 17) and waits for a next write command (step 18). Incidentally, destaging of write data stored in the cache memory 221 to the disk device is made on the basis of the aforementioned rule of LRU or the like independent of the process such as remote copy.

Figure 3:
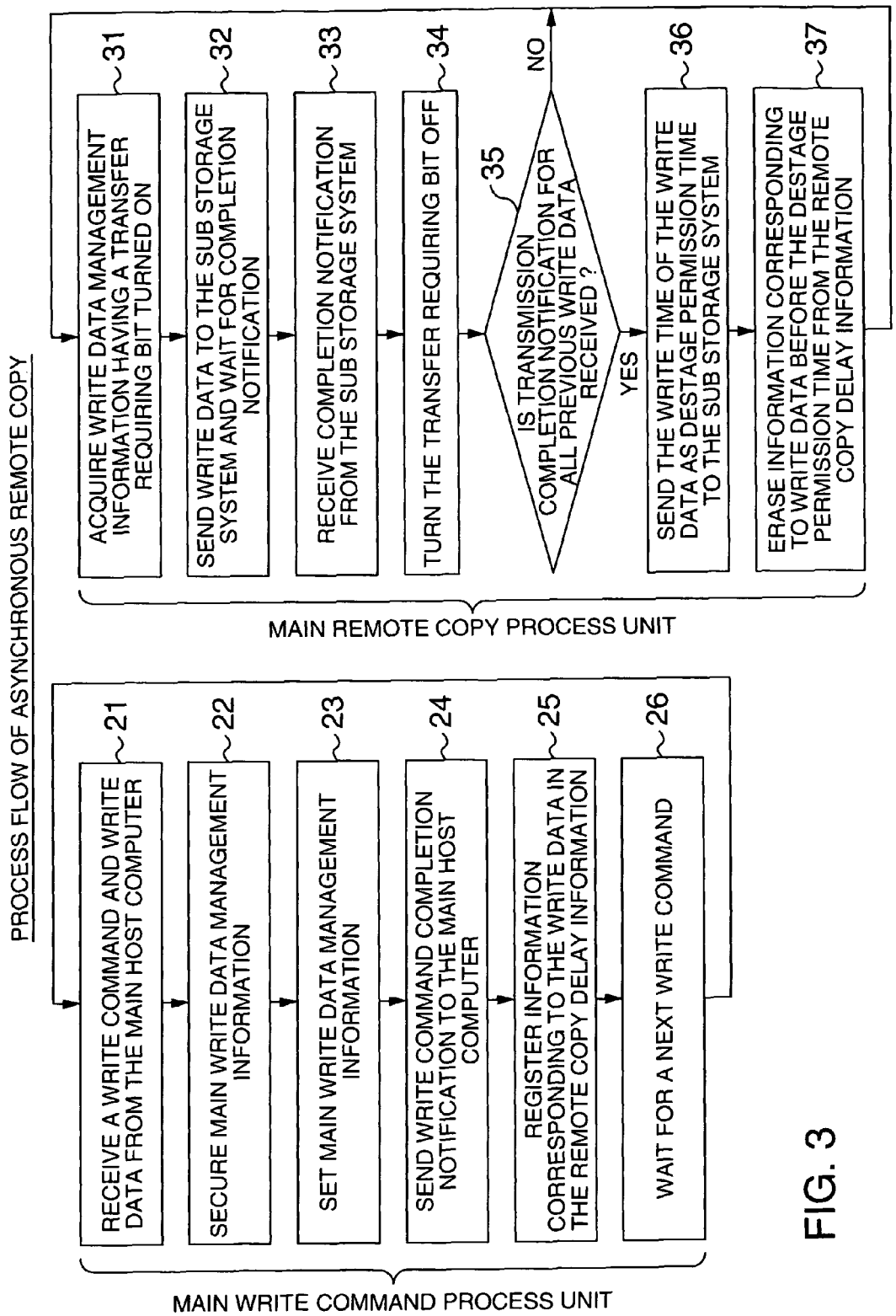
FIG. 3 is a view showing the outline of an asynchronous remote copy process on a main storage system side in the embodiment.

FIG. 3 is a view showing a processing flow of asynchronous remote copy.

Incidentally, asynchronous remote copy used in this embodiment is a method in which consideration is made so that the sequence of write I/O in the sub storage system 4 does not differ from that in the main storage system 2 to guarantee the consistency of the transaction in the process of restarting the database management system on the recovery site as described above.

If a difference in write sequence is generated, there may arise a problem that the database management system on the recovery site cannot interpret the log at the time of restart so as to be interrupted or updating of DB data corresponding to the transaction to be rolled back cannot be canceled because of occurrence of a state in which the log that must be continuously written in the logical disk of the sub storage system 4 is partially dropped out while not updated or a state in which update data corresponding to the transaction not written in the log logical disk are written in the DB data logical disk.

Upon reception of the write command and write data from the main host computer 1 (step 21), the main write command process unit 211 of the main storage system 2 reserves a region on the control memory 222 for storing main write data management information 223 corresponding to the received write data. Also on this occasion, the received write data are stored in the cache memory 221 (step 22). Then, the main write command process unit 211 sets information on respective entries of the main write data management information 223 (step 23) and sends a notice of completion of the write command process to the main host computer (step 24).

After sending the notice of completion, the main write command process unit 211 registers the write data in the remote copy delay information 225 (step 25) and waits for a next write command (step 26). The number of write commands delayed to be transferred (not sent to the sub storage system yet), the total amount of delayed write data, etc. may be conceived as the contents of the remote copy delay information. The main write command process unit 211 updates the remote copy delay information by registering information corresponding to the kind of the remote copy delay information concerning the write data, the notice of completion of which has been already sent, into the remote copy delay information.

The main remote copy process unit 212 starts a process asynchronously with the main write command process unit 211. This process is executed whenever there are write data having the transfer requiring bit turned on. Accordingly, the main remote copy process unit 212 may be provided as a demon program resident in the memory used by the processor.

First, the main remote copy process unit 212 acquires the oldest write time registered in the entry of write time 2234 and having the transfer requiring bit turned on but the transfer process not started yet among the respective entries of main write data management information 223 registered in the control memory 222 (step 31). Then, the main remote copy process unit 212 reads write data corresponding to the acquired main write data management information 223 from the cache memory 221 or the main DB disk 231 and sends the write data to the sub storage system (step 32).

Upon reception of a notice of completion from the sub storage system 4 (step 33), the main remote copy process unit 212 turns off the bit stored in the entry of transfer requiring bit 2237 of the main write data management information 223 corresponding to the write data (step 34). Here, the main remote copy process unit 212 refers to the write time 2234 of the main write data management information 223 stored in the control memory 222 to thereby judge whether all transfer requiring bits in main write data management information 223 having older write time than the write time corresponding to the write data, the notice of completion of which has been received, are off or not (step 35). If there are write data having older write time than the write time of the write data corresponding to the notice of completion and having been not transferred to the sub storage system 4 yet, the main remote copy process unit 212 repeats the steps 31 to 35.

On the other hand, when the judgment in the step 35 makes a decision that all write data having older write time than the write time of the write data corresponding to the notice of completion have been already transferred to the sub storage system 4, the main remote copy process unit 212 sends the write time of the write data corresponding to the notice of completion as destage permission time to the sub storage system 4 and receives a notice of confirmation of reception from the sub storage system 4 (step 36). As a result, the sub storage system 4 is informed of the destage permission time, so that write data having older write time than the destage permission time are asserted in the sub storage system 4 (so as to be enabled to be used at the time of restart of the standby database management system 300). Accordingly, the main remote copy process unit 212 erases information corresponding to write data having the older write time than the destage permission time from the remote copy delay information 225 (step 37).

FIG. 5 is a view showing a processing procedure in the case where the sub storage system 4 receives write data from the main storage system 2. Incidentally, processing in the sub storage system 4 is substantially common to synchronous remote copy and asynchronous remote copy.

Upon reception of certain data from the main storage system 2 through the link 5, the sub remote copy process unit 412 judges whether the received data is write data or destage permission time (step 41). When the received data is write data, the sub remote copy process unit 412 reserves a region on the control memory 422 for storing sub write data management information (step 42) and sets the sub write data management information 423. Incidentally, the received data is stored in the cache memory 421 (step 43).

Figure 6:
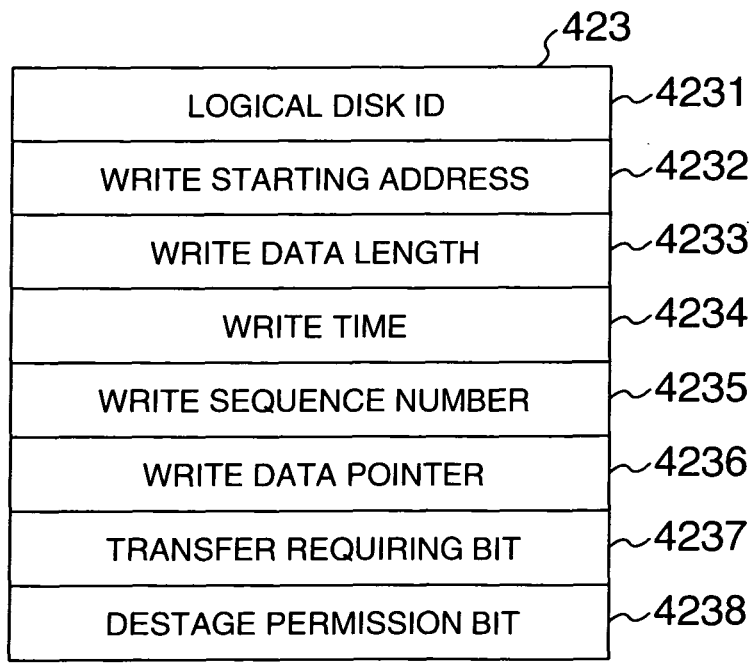
FIG. 6 is a view showing sub write data management information in the embodiment.

FIG. 6 is a view showing an example of configuration of the sub write data management information 423. The sub write data management information 423 is generated whenever write data is received by the sub storage system 4. One piece of sub write data management information 423 has a plurality of entries for registering information. Information indicating the position where the write data is to be stored on the sub storage system 4 side is stored in the entries of logical disk ID 4231, write starting address 4232 and write data length 4233. Time and write sequence number given by the main storage system 2 are directly registered in the entries of write time 4234 and write sequence number 4235.

Information indicating the address of the cache memory 421 where the write data is stored on the sub storage system 4 side is registered in the entry of write data pointer 4236. The entry of transfer requiring bit 4237 is not used in the sub storage system 4. A bit indicating whether the write data is to be stored in the logical disk is registered in the entry of destage permission bit 4238. Incidentally, the bit is turned off at the stage in which the write data is received by the sub storage system 4.

Referring back to FIG. 5, the processing procedure will be described. After setting of the sub write data management information, the sub remote copy process unit 412 sends a notice of completion of reception of the write command to the main storage system 2 (step 44) and waits for next data sent from the main storage system 2 (step 45).

When the data received by the step 41 is destage permission time, the sub remote copy process unit 412 updates information of destage permission time stored in the control memory 422 to the received value (step 50). Then, the sub remote copy process unit 412 turns on the destage permission bit of sub write data management information 423 having older write time than the destage permission time by searching information on the control memory 422 (step 51) and waits for next data sent from the main storage system (step 45).

The write data having the destage permission bit 4238 turned on is written in the logical disk by the sub destage process unit 414 at predetermined condition, for example, when the amount of dirty block on the cache memory 421 exceeds its threshold. As described above with reference to FIG. 3, the fact that all write data having older write time than the destage permission time have already reached the sub storage system is confirmed in the step 35. Accordingly, when the destage permission bit is turned on in step 51 in FIG. 5, all write data having older write time than the destage permission time are enabled to be used for restarting the database management system. Then, the write data are destaged to the logical disk in order of write time.

This procedure using write time and destage permission bit can prevent the write sequence in the sub storage system 4 from being reversed to the write sequence in the main storage system 2. Accordingly, as described preliminarily, transaction consistency can be guaranteed at the time of restart of the database management system.

Incidentally, in the database management system, it is recommended that log data and DB data are arranged in different logical disks respectively to prevent both log data and DB data from vanishing at once because of a disk failure. It is also necessary to guarantee the I/O sequence on both log data and DB data. Accordingly, in this embodiment, a plurality of logical disks are grouped so that the aforementioned I/O sequence is guaranteed on all logical disks belonging to one group. This group is hereinafter referred to as "consistency group". As a specific sequence guarantee, the time sequence of write data is kept at the time of data write (destage) into a group of logical disks constituting a consistency group.

Various tables used in this embodiment will be described below. These tables are used when the storage system checks the state of each logical disk or checks whether the logical disk is a subject of synchronous/asynchronous remote copy or not.

FIG. 7 is a view showing an example of information constituting a DB-disk mapping table 121. The DB-disk mapping table 121 has a plurality of entries for registering the following information according to each database region. Specifically, the DB-disk mapping table 121 contains: database region ID as information for identifying a database region of the main DB disk 231; file ID indicating the sequence number of one of files constituting the database region identified by the database region ID; and kind information indicating which data in the database region is among database data, log information and status information.

The DB-disk mapping table 121 further contains respective information concerning the main storage system 2 and the sub storage system 4 with respect to storage system ID for identifying a storage system in which the database region is mapped and logical disk ID (LUN) for identifying a logical disk of the storage system which is identified by the storage system ID and in which the database region is mapped. Incidentally, the DB-disk mapping table 121 is generated so that the aforementioned information is provided according to every database region.

The DB-disk mapping table 321 in the sub host computer 3 has the same configuration as that of the DB-disk mapping table 121 in the main host computer 1.

FIG. 8 is a view showing an example of a main/sub remote copy management table. Each of the main remote copy management table 224 and the sub remote copy management table 425 has a plurality of entries for registering the following information according to every logical disk. Specifically, this table contains respective information concerning the main storage system 2 and the sub storage system 4 with respect to copy mode indicating whether the write process is to be executed by synchronous remote copy or by asynchronous remote copy, storage system ID of the storage system used for executing the write process in the selected copy mode and logical disk ID of the logical disk used for executing the write process in the selected copy mode. When the update sequence of a plurality of logical disks needs to be guaranteed in asynchronous remote copy, one consistency group ID is given to the plurality of logical disks. When the consistency group ID is not used, NULL is given. These pieces of information concerning consistency group are also registered on this table.

The main storage system 2 makes a judgment on the basis of information on the DB-disk mapping table 121 shown in FIG. 7 and the main remote copy management table 224 shown in FIG. 8 as to whether the write data for the logical disk having the log block, the DB block and the status information is to be transferred to the sub storage system 4 by synchronous remote copy or by asynchronous remote copy.

For example, as shown in FIG. 8, the log block identified by the database region ID "LOG1" is written in the logical disk identified by the main logical disk ID "VOL12-A" in the main storage system identified by the main storage system ID "CTL#A1". As shown in FIG. 8, because the copy mode in the main logical disk ID "VOL12-A" and the main storage system ID "CTL#A1" is "synchronous", the log block identified by the database region ID "LOG1" is written in the sub storage system 4 by synchronous remote copy process. Incidentally, information on these tables and information concerning pairing of logical disks etc. in remote copy is registered through a storage management program executed by the host computer 1 or through a management computer.

Incidentally, the standby system constituted by the sub host computer 3 and the sub storage system 4 is formed so that the sub host computer 3 is not active during the operation of the active system constituted by the main host computer 1 and the main storage system 2. The sub storage system 4 however receives log blocks, DB blocks and status information from the main storage system 2 through the link 5 and updates logical disks corresponding to these pieces of information.

As described above, when a checkpoint is generated and recorded or acquired, the checkpoint process unit 112 of the main host computer 1 in this embodiment operates so that all DB blocks updated on the DB buffer 122 are stored in the main DB disk 231 and that status information indicating the position of the log record at that point of time is stored in the main status disk 232. The checkpoint generation process will be described below.

Figure 9:
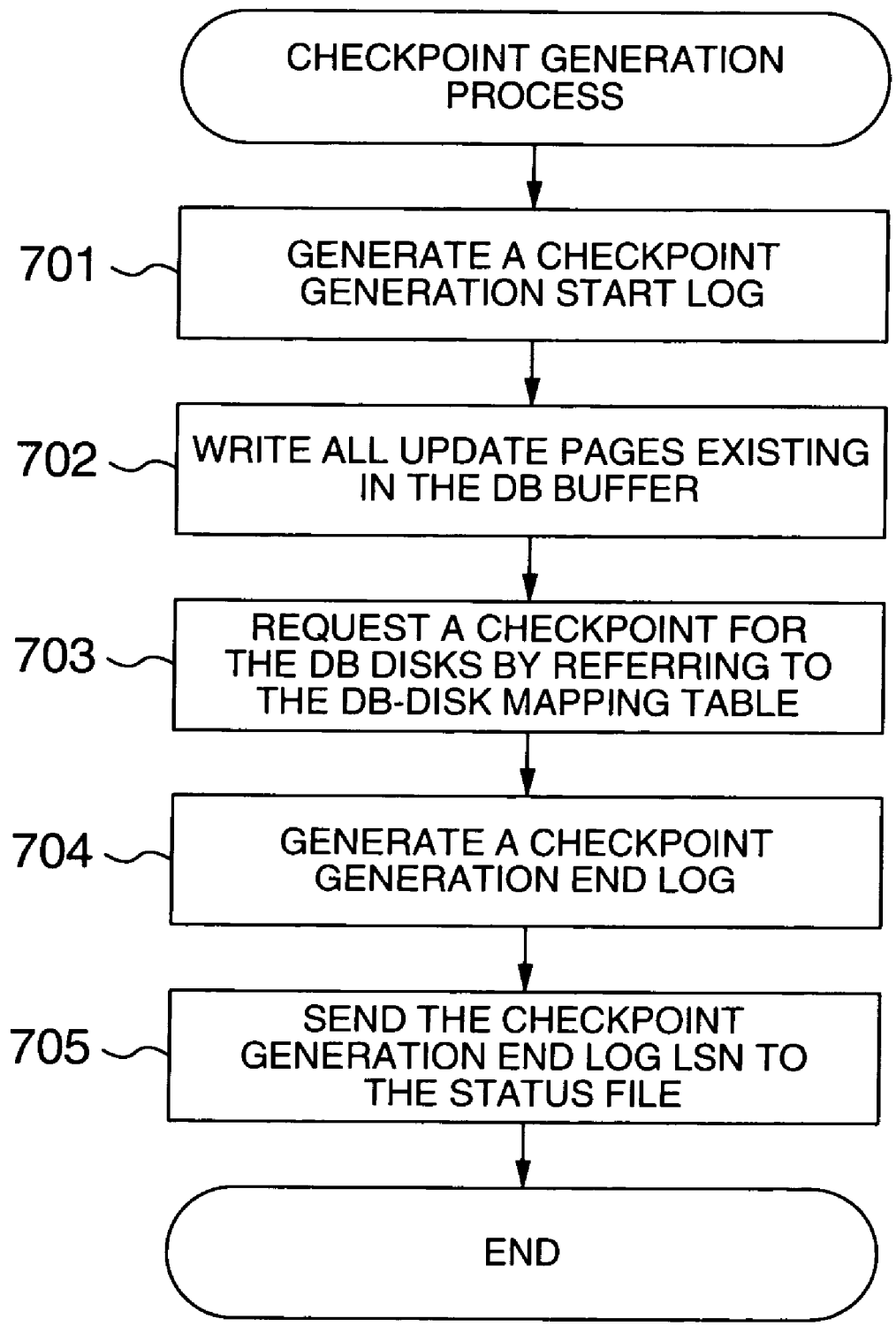
FIG. 9 is a flow chart showing the procedure of a checkpoint generation process in the embodiment.

FIG. 9 is a flow chart showing an example of the processing procedure of the checkpoint generation process.

When the contents of the DB buffer 122 in the main host computer 1 need to be reflected on the storage device in the main storage system 2, the checkpoint process unit 112 of the main host computer 1 operates to send a write request from the main host computer 1 to the main storage system 2 to write all DB blocks updated on the DB buffer 122 and status information indicating the position of the newest log record at that point of time.

First, the checkpoint process unit 112 generates a checkpoint generation start log for indicating the start of checkpoint generation and stores it in the main log disk (step 701).

Then, the checkpoint process unit 112 generates a write command to write all DB blocks updated on the DB buffer 122 in the main storage system 2 and sends the write command to the main storage system 2 to request the main storage system 2 to write the DB blocks. Upon reception of the generated write command, the main storage system 2 writes the DB blocks in the cache memory 221 so that the update contents of the DB buffer 122 can be reflected on the cache memory 221 (step 702).

Then, the checkpoint process unit 112 sends a checkpoint request to the main storage system 2. Upon reception of the checkpoint request, the main storage system 2 executes a process based on the checkpoint request and sends a notice of completion of the process to the checkpoint process unit 112 (step 703). Incidentally, details of the process executed in the step 703 will be described later.

Upon reception of the notice of completion, the checkpoint process unit 112 generates a checkpoint generation completion log indicating the completion of checkpoint generation and stores it in the log block of the main log disk (step 704).

Then, the checkpoint process unit 112 generates a write command to write LSN (Log Sequence Number) of the checkpoint generation completion log as status information in the main storage system 2 and sends the write command to the main storage system 2 to request the main storage system 2 to write status information. Upon reception of the write command, the main storage system 2 writes the status information in the main status disk 232 (step 705).

The processing procedure of the aforementioned step 703 will be described below. Incidentally, the main storage system in this embodiment sends a write request at the checkpoint time to the sub storage system 4 asynchronously as described above. When a write request is given at the checkpoint time, the write request and write requests temporarily accumulated up to that point of time for asynchronous remote copy may be sent to the sub storage system 4. This example will be described below.

When the main host computer 1 sends a main DB volume checkpoint request to the main storage system 2 to request the checkpoint of the main DB disk 231, the main storage system 2 sends remote copy data temporarily stored in the cache memory in the main storage system 2 or in a queue in the disk device at that point of time to the sub storage system 4 and sends DB blocks and status information received by the main DB volume checkpoint request to the sub storage system 4.

The sub storage system 4 writes all the DB blocks and status information sent together with the write request in the cache memory 421. Then, the sub storage system 4 generates a remote copy completion notification indicating the completion of the writing and sends the remote copy completion notification to the main storage system 2.

Upon reception of the remote copy completion notification from the sub storage system 4, the main storage system 2 generates a main DB volume checkpoint completion notification indicating the completion of the checkpoint process requested from the main host computer 1 and sends the main DB volume checkpoint completion notification to the main host computer 1.

As described above, when a data synchronizing process using synchronous remote copy is made between the main storage system 2 and the sub storage system 4 at the time of the log block write request and at the time of the checkpoint request, the update contents of the transaction completed on the active system can be prevented from vanishing on the standby system and the performance of the active system can be prevented from deteriorating compared with the case where all DB blocks and status information are transferred by synchronous remote copy because the DB blocks and status information can be collectively written at the time of the checkpoint. In addition, in this case, even though a database management system having no separated status file is used, DB update data reflected on the storage in the active system can be prevented from vanishing on the standby system at the point of time of the checkpoint.

When the active database management system 100 starts a restarting process after the database process in the active database management system 100 is terminated abnormally because of a failure or the like, a log record is read from the position of the checkpoint designated by the status information in the main status disk 232 and data in the main DB disk 231 are updated according to the contents of the log record so that the database can be recovered to the state of completion just before the abnormal termination.

As described above, in the system according to this embodiment, when there is a request to write a log block, a synchronous remote copy process is executed for writing the log block in the sub storage system 4 synchronously with writing in the main storage system 2. Accordingly, the update contents of the transaction completed on the active system can be prevented from vanishing on the standby system.

When there is a request to write DB blocks and status information, an asynchronous remote copy process is executed for writing in the sub storage system 4 asynchronously with writing in the main storage system 2. Accordingly, the performance of the active system can be restrained from deteriorating.

A procedure for restarting the standby database management system on the standby system at the disabled state of the active system inclusive of the active database management system will be described below.

FIG. 10 is a flow chart showing the procedure of the database management system restart process. When the operation of the active system is changed over to the operation of the standby system so that the standby database management system starts a database process, the DB access control unit 311 of the sub host computer 3 instructs the sub storage system 4 to execute the database management system restart process.

The command process unit 411 of the sub storage system 4 instructed to execute the restart process reads a status file stored in the status disk 432 and acquires information indicating the state of the database. In this embodiment, information indicating the middle of operation of the active database management system is stored as information indicating the state of the database in the status file at the time of start of the database process and information indicating the normal termination of the active database management system is stored as information indicating the state of the database in the status file at the time of completion of the database process (step 1201).

Then, the command process unit 411 refers to the acquired information indicating the state of the database to thereby examine whether the database process in the previous cycle is terminated normally or not (step 1202).

When the acquired state of the database indicates the middle of operation of the database management system, that is, when information indicating normal termination of the database management system is not recorded in the status file, the command process unit 411 judges that the database process in the previous cycle is not terminated normally, and specifies the position of the log record at the time of the newest checkpoint just before the database process not normally terminated by referring to the status information stored in the status disk (step 1203).

Then, the command process unit 411 reads log records successively from the acquired log record position by referring to the sub log disk 431 and executes a roll forward process for database regions in the sub DB disk 433, that is, executes a process for updating data according to the log (step 1204).

Then, the command process unit 411 executes a roll back process for canceling uncompleted transaction among transactions subjected to the roll forward process according to the log records (step 1205).

When a decision is made in the step 1202 that the database process is terminated normally or when the roll back process in the step 1205 is completed, the command process unit 411 stores information indicating the middle of operation of the database management system and status information indicating the position of the log record after recovery in the status file in the sub status disk 432 (step 1206).

Generally, in the conventional database management system, data updated in a transaction are not written in the storage system synchronously with completion (commitment) of the transaction but a turning point called as "checkpoint" is provided based on a predetermined frequency of occurrence of the transaction or a predetermined time so that DB update data at the time of the checkpoint are written in the storage system to keep the performance of execution of the transaction. On the other hand, the update contents of DB data after the checkpoint are written in the log disk. In the process for restarting the standby system at the time of system down of the active host computer, update DB data after the checkpoint are restored based on the update history in the log disk and recovered.

Which log disk needs to be selected as a subject of reflection of log information after the newest checkpoint at the time of restart of the standby system and which position of the selected log disk needs to selected as a start position for reading the log information make an issue. Generally, such information is stored in a header portion etc. of each log disk. Accordingly, the log disk as a subject of reflection and the read position are decided on the basis of this information at the time of restart of the standby system.

If this system is configured so simply that synchronous remote copy is applied to log disks while asynchronous remote copy is applied to DB disks, there is a possibility that the update contents of DB data after completion of the checkpoint process on the log disk on the main site may have not been transferred to the remote site yet. If information such as the aforementioned header portion of the log disk is used, update DB data reflected on the storage system at the point of time of the checkpoint on the main site may vanish on the remote site to make consistent recovery impossible.

On the contrary, in the system according to this embodiment, a status file for managing a log disk input point at the time of the checkpoint is provided so that inconsistent recovery can be avoided on the sub storage system 4 even in the case where log blocks are processed by synchronous remote copy while DB blocks are processed by asynchronous remote copy. Moreover, the status file is transferred by the asynchronous remote copy process and the status disk and the DB disk are set as one consistency group so that the update sequence of the DB blocks transferred asynchronously in the same manner as the status file can be guaranteed on the sub storage system 4.

Accordingly, after the active system is changed over to the standby system, the status file in the sub status disk 432 can be referred to at the time of start of the database process so that data are recovered from the position designated by the status information.

A modification of the embodiment of the invention will be described below.

It is very important to manage time (recovery time) until a transaction not continued on the main site because of a disaster etc. is handed over to the recovery site. As the time of interruption of the transaction increases, the opportunity of doing business decreases and company's reputation is lost. Because non-stop service throughout every day of the year has advanced with the popularization of the Internet, there is a possibility that long-term interruption of the transaction will bring a fatal damage to the company.

In the conventional database management system, the processing time (hereinafter referred to as "restart process time") required for restarting the active system once interrupted because of a disaster etc. can be limited. Specifically, the amount of log data to be processed at the time of restart after the disaster increases as the update amount of DB data accumulated on the DB buffer increases. Accordingly, when, for example, the number of blocks updated on the DB buffer exceeds a predetermined value, the checkpoint process is started to thereby limit the restart process time. In this manner, the time required for the recovery process is limited to guarantee rapid restoration of the system.

A technique for guaranteeing rapid restoration of the system according to this embodiment will be described below. Even in the case where the conventional technique is used, it is possible to limit the restart process time of the database management system after the active system is changed over to the standby system by the system according to this embodiment. The conventional technique is however insufficient as follows. The DB data disk on the recovery site, as to the update state of the DB data disk, is delayed for a data update delay due to asynchronous remote copy from the DB data disk of the main storage system 2. The amount of DB data updated into the logical disk is small in the DB data disk on the recovery site (the amount of log data used for updating becomes larger than that in the main storage system by a value corresponding to the data update delay). For this reason, the restart process time cannot be calculated accurately unless the amount of the update delay due to asynchronous remote copy can be grasped.

To grasp the amount of the delay, the main storage system 2 has remote copy delay information 225 on the control memory 222. In the asynchronous remote copy process, this information is updated successively (steps 25 and 37 in FIG. 3). Further, the main remote copy delay management unit 213 transfers the remote copy delay information to a requester in response to a request from the main host computer 1 or the management computer 9 through the network 6 or the main I/O channel 7.

Further, the remote delay management unit 115 of the active database management system 100 receives the remote copy delay information 225 from the main storage system 2 at a prefixed time, at intervals of a predetermined period or with a certain event as a turning point and checks whether the remote copy delay information 225 exceeds a predetermined threshold or not. This threshold is set by the active database management system 100 or the management computer 9 operated by the system administrator in consideration of the target value of the recovery time. The active database management system 100 or the management computer 9 has an interface for setting this threshold.

When the remote copy delay information 225 exceeds the threshold, the remote delay management unit 115 sends a report to the delay monitoring unit 922 of the management computer 9 or the system administrator. Upon reception of this report, the delay monitoring unit 922 starts a predetermined process (which will be described below). On this occasion, the management computer 9 may check the remote copy delay information 225 and send a report to the active database management system 100, the system administrator or system administration software.

When the main host computer 1 detects the fact that the remote copy delay information 225 exceeds the threshold, the main host computer 1 executes the following process to prevent increase in delay.

First, when the remote copy delay information 225 exceeds the threshold, the remote delay management unit 115 of the main host computer 1 sends a notice to the DB access control unit 111 to delay the completion of the transaction currently processed or limit new transactions which will flow into the DB access control unit 111. Upon reception of this notice, the DB access control unit 111 prevents increase in delay by executing the steps of: (a) rejecting new transactions from upper application programs; and (b) delaying the completion of the transaction currently processed.

On the other hand, when the management computer 9 detects the fact that the remote copy delay information 225 exceeds the threshold, the management computer 9 executes the following process to prevent increase in delay.

When, for example, increase in the amount of delay of asynchronous remote copy between the storage systems is a cause of increase in delay, the management computer 9 instructs the storage systems to (a) strengthen the link 5 between the storage system on the main site and the storage system on the recovery site (specifically, reserve the communication band) and (b) increase storage resources such as interfaces, processors, etc. allocated for the asynchronous remote copy process to thereby prevent increase in the amount of delay. When the amount of data on the DB buffer increases for another reason, for example, because of increase in checkpoint interval, the management computer 9 instructs the database management system 10 to shorten the checkpoint interval.

A further modification of the embodiment will be described below.

The log block described above in the aforementioned embodiment is recorded additionally on a storage region having substantially continuous addresses. On the other hand, the storage region needs to be re-used because it is a matter of course that the capacity of the log logical disk is finite. Accordingly, in this modification, there is employed a method in which the log management unit 113 reserves a plurality of log files on the log logical disk so that the attribute of a log file (log indicating the fact that update data have been already stored in the DB logical disk) becoming unnecessary for the restart process can be overwritten (the log file having this attribute is referred to as "online archive") so as to be provided for re-use. Before the log file is re-used for recording a new log, the log file may be saved to a removable medium such as a magnetic tape device. The saved log file is hereinafter referred to as "offline archive". On the other hand, a log file in which a log necessary for the restart process is recorded is regarded as an active log file, that is, not regarded as a subject of re-use.

Incidentally, in this modification, the following point needs to be considered. That is, in the restart process of the standby system according to the aforementioned embodiment, there is a possibility that the log necessary for starting the roll forward process may be in a log file in the online archives because DB data are older than log blocks. Since this is an improbable situation in the ordinary restart process (based on the assumption that update time of a log block coincides with update time of corresponding DB data), the check mechanism of the database management system may operate and cause a problem of interruption of the restart process by judging that the log and the status information are inconsistent with each other.

Therefore, in this modification, a restart mode management unit 316 is provided in the sub host computer 3 and a new mode is set for the restart process, that is, a mode for executing the roll forward process from the online (or offline) archives is set for the restart process in order to make the check mechanism inactive. Alternatively, when the sub write command process unit 411 confirms the log file to be used preferentially by referring to the status information on the sub status disk 432 indicating the state of the log file at the time of the restart process and executes the restart process, this problem can be avoided.

In addition, in this modification, the following point needs to be considered.

As described above, a log file in the online archives is a candidate for re-use. It is however impossible to complete recovery if the log necessary for restart on the standby database management system is overwritten by re-use. It is therefore necessary to prevent the log necessary for restart on the standby database management system from being overwritten.

Accordingly, in this modification, the remote delay management unit 115 of the active database management system grasps the amount of delay in the main DB disk 231 due to asynchronous remote copy and manages the state of the log file. Specifically, in accordance with the grasped amount of delay, the log management unit 113 can make management so that the attribute of a log file concerning data reflected on the main DB disk 231 is set as active attribute while DB data are not transferred to the sub storage system so that the log file necessary for restart on the standby database management system is not re-used.

Incidentally, as described above, the amount of delay of asynchronous remote copy is provided by the main remote copy delay management unit 213 of the main storage system 2. The main storage system 2 may send information of the amount of delay directly to the main host computer 1 operating the active database management system 100 or may send the information once to the management computer 9 so that the management computer 9 gives an instruction to the active database management system 100.

The way of managing the amount of delay of asynchronous remote copy in the main storage system will be described below.

The main storage system 2 has a main remote copy delay management unit 213 through which the main storage system 2 manages the amount of delay of asynchronous remote copy. The main remote copy delay management unit 213 manages information of the amount of delay as remote copy delay information 225 in accordance with a logical disk executing asynchronous remote copy, a specific address region of the logical disk, a consistency group etc. The main remote copy delay management unit 213 transfers the information of the amount of delay to the main host computer 1 or the management computer 9 in accordance with necessity. Incidentally, updating of the amount of delay etc. has been described above and the description thereof will be omitted.

The following information can be used as the amount of delay.

(a) The amount of data that have been already completed in terms of write process from the main host computer 1 but have not been completed in terms of destage permission from the sub storage system 4 on the recovery site yet.

(b) The list of write processes (logical disk ID, starting block address, data length, etc.) that have been already completed in terms of write process from the main host computer 1 but have not been completed in terms of destage permission from the sub storage system 4 on the recovery site yet.

(c) The number of write commands that have been already completed in terms of write process from the main host computer 1 but have not been completed in terms of destage permission from the sub storage system 4 on the recovery site yet.

(d) Information concerning the oldest write command or write management information that has been already completed in terms of write process from the main host computer 1 but has not been completed in terms of destage permission from the sub storage system 4 on the recovery site yet.

In this modification, the main storage system 2 has an interface for transferring the amount of delay to the main host computer 1 or the management computer 9. Specifically, the main remote copy management unit 213 can communicate with the main host computer 1 or the management computer 9 through the main I/O channel 7 or the network 6. The main storage system 2 has a function for providing data (data given destage permission on the cache memory and data updated on the logical disk) asserted in the logical disk on the sub storage system 4 to the DB server or the management computer 9 in order to confirm the state of delay due to asynchronous remote copy.

Specifically, the main storage system 2 provides logical volume to the main host computer 1 so that the main host computer 1 can make access to the sub status disk 432. When the main host computer 1 reads a block from the sub status disk 432, the main remote copy process unit 212 sends a read command for reading the block to the sub storage system 4 through the link 5 if the write time 2234 corresponding to the block is newer than the destage permission time. Upon reception of the read command, the sub remote copy process unit 412 reads data from the corresponding block of the sub status disk 432 and sends the data to the main storage system 2 through the link 5.

On the other hand, if the write time 2234 corresponding to the block as a subject of the read request from the main host computer 1 is older than the destage permission time, the main write command process unit 211 reads data from the corresponding block of the main status disk 232 and transfers the data to the main host computer 1. As a result, the main host computer 1 can make access to data in the sub status disk 432, so that the main host computer 1 can acquire information of the newest checkpoint on the recovery site. Incidentally, the judgment of the write time may be omitted if the main host computer 1 can read all blocks from the sub storage system 4.

In conclusion, the system according to this modification satisfies the following conditions so that the database management system can acquire and use the amount of delay of asynchronous remote copy collected in the modification. Incidentally, the system need not satisfy all the conditions.

(a) The remote delay management unit 115 inquires of the storage system or the management computer the amount of delay of asynchronous remote copy and acquires information thereof.

(b) The remote delay management unit 115 decides the position of the checkpoint on the basis of the acquired amount of delay so that the standby database management system on the recovery site can use the checkpoint for restart.

(c) The remote delay management unit 115 and the log management unit 113 make management on the basis of the position of the checkpoint decided by (b) so that the log used for restart in the standby database management system on the recovery site can be prevented from being overwritten as an offline archive for re-use of the region.

(d) The log management unit 113 records the status information of the log in another file than the log file.

(e) The restart mode management unit 316 of the sub host computer 3 has a restart mode based on the assumption that DB data are delayed from log data in the sub storage system 4. The sub host computer 3 has an interface (GUI or the like) through which the system administrator or the like can set the mode from the outside.

As a further embodiment, a storage management software program executed by the management computer 9 for managing the aforementioned system executes the following process.

(a) A log logical volume is set for synchronous remote copy while a DB data logical volume and a status information logical volume are set as one consistency group for asynchronous remote copy on the basis of an instruction from the administrator or the like.

(b) The amount of delay of asynchronous remote copy is acquired from the storage system or the database management system and monitored.

(c) The threshold of the amount of delay of asynchronous remote copy is set in advance on the basis of an instruction from the administrator or the like, so that the administrator or another computer is informed when the amount of delay of asynchronous remote copy exceeds the threshold.

(d) The active database management system is set in such a mode that the log necessary for restart on the recovery site can be prevented from vanishing.

(e) The standby database management system is set in a restart mode based on the assumption that DB data are delayed from log data, so that a restart command is issued after a disaster occurs in the main site.

As described above, in the system according to this embodiment, log information is updated by synchronous remote copy while database data and status information are updated by asynchronous remote copy when there is a request to write data in the standby system. Accordingly, the update contents of a transaction completed on the active system are not lost in the standby system, so that a disaster restoration system little in deterioration of performance of the active system can be constructed.

More specifically, according to this embodiment, the information of the transaction committed by the active database management system can be surely sent to the sub storage system because log data are transferred by synchronous remote copy. In addition, the write process for writing data in the DB data logical disk is little affected by the delay time of remote copy because asynchronous remote copy is used for DB data.

Incidentally, in the invention, synchronous remote copy is used for log data with attention paid to the following point.

Because log data can be written additionally, access to the log logical disk is substantially sequential. Although the magnetic disk device is dominated by the mechanical operating time such as the waiting time for completion of seek or rotation to position the magnetic head in a target recording region in the case of random access, the influence of the mechanical operating time can be minimized in the case of sequential access so that the log data can be written speedily. Moreover, the database management system temporarily stores data written in the log logical disk in the log buffer on the DB server. When the write process response time in the log logical disk increases because of the influence of synchronous remote copy, the amount of data accumulated in the log buffer increases. The write process can be however collected easily by one command in spite of increase in the amount of accumulated log data because the log data are substantially sequential. Because a range of access of a typical write command can be designated by a combination of a starting address and a data length, access to a continuous region can be collected as one command except for increase in data length. Accordingly, the influence of the write process response time can be reduced.

According to the invention, the possibility that the update contents of a transaction already executed will be lost can be reduced.

It should be further understood by those skilled in the art that although the foregoing description has been made on embodiments of the invention, the invention is not limited thereto and various changes and modifications may be made without departing from the spirit of the invention and the scope of the appended claims.

Japanese Patent Application No. 2004-079448 applied on Mar. 19, 2004 in Japan is cited to support the present invention.

What is claimed is:

1. A system comprising:
a first storage system;
a second storage system coupled to the first storage system;
a computer coupled to the first storage system; and
a management computer coupled to at least the first storage system,
wherein the computer sends log information indicating contents of a database process to the first storage system and sends database data to the first storage system,
wherein, said first storage system, upon receiving said log information from said computer, transfers said log information received from said computer to said second storage system by using a synchronous remote copy process,
wherein, said first storage system, upon receiving said database data from said computer, transfers said database data received from said computer to said second storage system by using an asynchronous remote copy process,
wherein the computer compares an amount of delay in transferring said database data according to the asynchronous remote copy process from the first storage system to the second storage system with a predetermined threshold and delays completion of a transaction process on said database data when the amount of delay exceeds the predetermined threshold,
wherein the first storage system comprises: a remote copy process unit that starts execution of the asynchronous remote copy process when any of the database data has a transfer requiring bit turned on; and a remote copy management delay unit that manages the amount of delay as remote copy delay information in accordance with a logical disk executing the asynchronous remote copy process, a specific address region of the logical disk, and a consistency group,
wherein the first storage system transfers the remote copy delay information to the computer or the management computer,
wherein when the computer sends a checkpoint request to the first storage system to request a checkpoint, the first storage system sends, to the second storage system, the database data corresponding to the time of the checkpoint, along with other database data temporarily accumulated in the first storage system up to the time of the checkpoint, and sends to the computer a completion notification indicating completion of the checkpoint request, and
wherein upon reception of the completion notification indicating the completion of the checkpoint request, the computer sends to the first storage system a write command to write a position of the log information relating to the checkpoint, and upon reception of the write command, the first storage system writes the position of the log information to a storage area of the first storage system, the position of the log information being used in a restart process executed on the second storage system.

2. A system according to claim 1, wherein the amount of delay is measured based on an amount of data that is completed in terms of write process from the computer and an amount of data to be sent to the second storage system in response to permission from the second storage system.

3. A system according to claim 1, wherein the amount of delay is measured based on an amount of write process that is completed in terms of write process from the computer and an amount of write process to be sent to the second storage system in response to permission from the second storage system.

4. A system according to claim 1, wherein the amount of delay is measured based on a number of write commands that is completed in terms of write process from the computer and a number of write commands to be sent to the second storage system in response to permission from the second storage system.

5. A system according to claim 1, wherein the amount of delay is measured based on information concerning the oldest write command or write management information that is completed in terms of write process from the computer and information concerning the oldest write command or write management information to be sent to the second storage system in response to permission from the second storage system.

6. The system according to claim 1, wherein the first storage system has remote copy delay information on a control memory, the information being arranged to be updated when the asynchronous remote copy operation is to be performed.

7. The system according to claim 1, wherein the computer has a remote delay management unit which inquires of the storage system or the management computer the amount of delay, acquires the remote copy delay information, decides a position of a checkpoint used for re-start of a second computer to be connected to a second storage system based on the amount of delay acquired in the remote copy delay information, and prevents a log to be used for the re-start from being overwritten.

8. The system according to claim 1, wherein the management computer reserves communication band within a network connecting the first storage system and the second storage system when an amount of the remote copy delay information exceeds the predetermined threshold value.

9. The system according to claim 1, wherein the management computer increases an amount of storage resources to be allocated for the asynchronous remote copy operation when the amount of remote copy delay information exceeds the predetermined threshold value.

10. The system according to claim 1,
wherein the computer further comprises a DB (database) buffer), and
wherein the management computer shortens an interval between a pair of checkpoints adjacently located when an amount of data in the DB buffer increases.

11. The system according to claim 1,
wherein the computer further comprises:
   a DB (database) buffer; and
   a log management unit that sends a write request from the computer to the first storage system to write a log block as log information indicating the contents of a database process performed on the DB buffer, and records status information regarding the log in a file other than a log file.

* * * * *